United States Patent
Berner et al.

(10) Patent No.: US 10,752,553 B2
(45) Date of Patent: Aug. 25, 2020

(54) BODY MADE OF A CERAMIC MATERIAL

(71) Applicant: STRAUMANN HOLDING AG, Basel (CH)

(72) Inventors: Simon Berner, Suhr (CH); Joachim Bibus, Bad Säckingen (DE)

(73) Assignee: STRAUMANN HOLDING AG, Basel (CH)

( * ) Notice: Subject to any disclaimer, the term of this patent is extended or adjusted under 35 U.S.C. 154(b) by 569 days.

(21) Appl. No.: 14/654,720

(22) PCT Filed: Dec. 23, 2013

(86) PCT No.: PCT/EP2013/003901
§ 371 (c)(1),
(2) Date: Jun. 22, 2015

(87) PCT Pub. No.: WO2014/101997
PCT Pub. Date: Jul. 3, 2014

(65) Prior Publication Data
US 2015/0315085 A1 Nov. 5, 2015

(30) Foreign Application Priority Data
Dec. 24, 2012 (EP) .................... 12008608

(51) Int. Cl.
C04B 35/48 (2006.01)
A61C 8/00 (2006.01)
(Continued)

(52) U.S. Cl.
CPC ............ C04B 35/48 (2013.01); A61C 8/0012 (2013.01); A61C 8/0037 (2013.01);
(Continued)

(58) Field of Classification Search
CPC ................ A61C 8/0012; A61C 8/0037; A61C 2008/0046; C04B 35/48; C04B 35/488;
(Continued)

(56) References Cited

U.S. PATENT DOCUMENTS 4,525,464 A * 6/1985 Claussen ............. C04B 35/4885
264/662
RE32,449 E 6/1987 Claussen et al.
(Continued)

FOREIGN PATENT DOCUMENTS

EP 1 600 176 A1 11/2005
EP 1 982 670 A1 10/2008
(Continued)

OTHER PUBLICATIONS

Jun. 30, 2015 International Preliminary Report on Patentability issued in PCT/EP2013/003901.
(Continued)

Primary Examiner — Travis M Figg
Assistant Examiner — Ethan Weydemeyer
(74) Attorney, Agent, or Firm — Oliff PLC

(57) ABSTRACT

A body made of a ceramic material based on zirconia, the body having a surface region extending from the surface of the body to a predetermined depth and a core region integrally formed with the surface region. The ceramic material in the surface region includes a crystalline phase A formed by zirconia in tetragonal phase. The ceramic material in the surface region further includes a crystalline phase B, the crystal structure of which including apart from zirconium and oxygen at least one further component X in a periodic arrangement, the crystalline phase B having a lower theoretical density than crystalline phase A.

27 Claims, 11 Drawing Sheets

(51) Int. Cl.
*C04B 41/89* (2006.01)
*C04B 41/52* (2006.01)
*C04B 41/50* (2006.01)
*C04B 35/488* (2006.01)
*C04B 41/87* (2006.01)
*C04B 41/00* (2006.01)
*C04B 111/00* (2006.01)

(52) U.S. Cl.
CPC .......... *C04B 35/488* (2013.01); *C04B 41/009* (2013.01); *C04B 41/5042* (2013.01); *C04B 41/52* (2013.01); *C04B 41/87* (2013.01); *C04B 41/89* (2013.01); *A61C 2008/0046* (2013.01); *C04B 2111/00836* (2013.01); *C04B 2235/3201* (2013.01); *C04B 2235/3206* (2013.01); *C04B 2235/3208* (2013.01); *C04B 2235/3225* (2013.01); *C04B 2235/3229* (2013.01); *C04B 2235/3232* (2013.01); *C04B 2235/3246* (2013.01); *C04B 2235/3418* (2013.01); *C04B 2235/401* (2013.01); *C04B 2235/442* (2013.01); *C04B 2235/443* (2013.01); *C04B 2235/75* (2013.01); *C04B 2235/765* (2013.01); *C04B 2235/96* (2013.01); *C04B 2235/963* (2013.01); *C04B 2235/9669* (2013.01); *Y10T 428/24355* (2015.01)

(58) Field of Classification Search
CPC ... C04B 41/009; C04B 41/5042; C04B 41/52; C04B 41/87; C04B 41/89; C04B 2111/00836; C04B 2235/3201; C04B 2235/3206; C04B 2235/3208; C04B 2235/3225; C04B 2235/3229; C04B 2235/3232; C04B 2235/3246; C04B 2235/3418; C04B 2235/401; C04B 2235/442; C04B 2235/443; C04B 2235/75; C04B 2235/765; C04B 2235/96; C04B 2235/963; C04B 2235/9669; Y10T 428/24355

See application file for complete search history.

(56) References Cited

U.S. PATENT DOCUMENTS

| | | |
|---|---|---|
| 6,033,727 A | 3/2000 | Baek et al. |
| 2011/0318582 A1 | 12/2011 | Dittmann et al. |
| 2012/0071986 A1 | 3/2012 | Anitua Aldecoa et al. |

FOREIGN PATENT DOCUMENTS

| | | | |
|---|---|---|---|
| EP | 2 371 344 A1 | 10/2011 | |
| JP | 2004-75532 A | 3/2004 | |
| WO | WO-2010107678 A1 * | 9/2010 | ......... C04B 35/6281 |
| WO | 2012/175218 A1 | 12/2012 | |

OTHER PUBLICATIONS

Apr. 24, 2014 International Search Report issued in PCT/EP2013/003901.

* cited by examiner

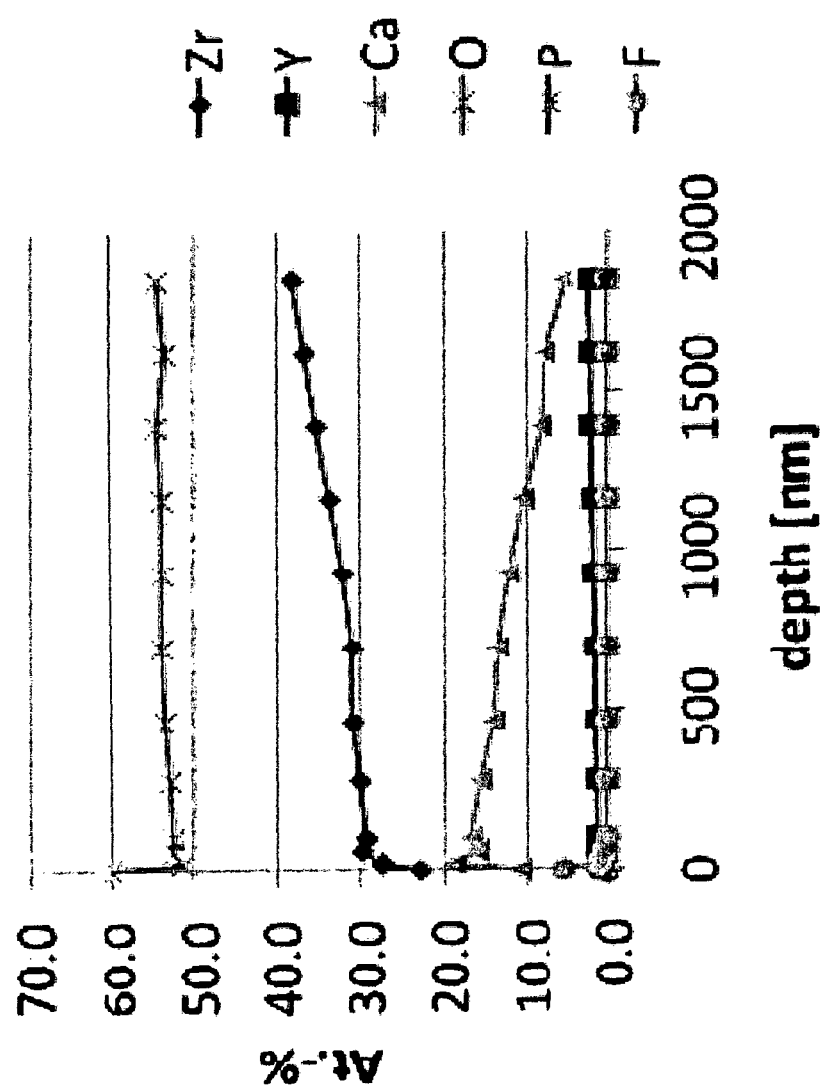

BODY MADE OF A CERAMIC MATERIAL

The present invention relates to a body made of a ceramic material based on zirconia, according to the preamble of claim 1, and to the use of the body as an implant, in particular a dental implant. The invention further relates to a process for preparing said body, according to the preamble of claim 16, more particularly to the use of said process for increasing the fracture toughness of a basic ceramic body as well as to the use of the process for increasing the flexural strength of a basic ceramic body.

In zirconia ceramics, the spatial arrangement of the atoms is characterized by distinct crystal structures, characterizing a property known as polymorphism.

From low to high temperatures, zirconia exhibits three allotropic crystal structures differing in their lattice system: it can be in monoclinic (m), tetragonal (t), and cubic (c) phase. Of these, the cubic phase has the highest density, whereas the monoclinic phase has the lowest density.

The presence of a certain crystalline phase depends on the external conditions and it has been found that transformation from one crystalline phase into another can be induced, e.g. by the application of heat, mechanical stress or chemical treatments.

In pure zirconia ceramics, for instance, the cubic phase is stable at a temperature above about 2370° C. At temperatures between about 2370° C. and about 1170° C., the tetragonal crystalline phase is mostly present, whereas below 1170° C. the monoclinic crystalline phase predominates.

Of particular interest is the phase transformation of the tetragonal phase (t) to the monoclinic phase (m) because of its martensitic nature. The process runs spontaneous and with sonic speed without recrystallization, accompanied by a volume expansion of about 4%.

By adding a stabilizing agent the high temperature phase (t) can be conserved at room-temperature in a metastable state. As a result the tetragonal-to-monoclinic transformation only takes place locally after bringing in external stresses in form of e.g. propagating cracks, inducing the compressive stresses and providing higher flexural strength an fracture toughness.

For a more detailed discussion of the martensitic transformation in zirconia, it is referred to J. Chevalier et al., "Low-Temperature Degradation of Zirconia and Implications for Biomedical Implants", Annu. Rev. Mater. Res. 2007. 37:1-32.

By the addition of a stabilizing agent (also referred to as a "stabilizer"), such as ceria (CeO), yttria ($Y_2O_3$) or magnesia (MgO), the tetragonal phase can be stabilized to a certain extent, as mentioned above. This metastable tetragonal zirconia can be used as a bulk, structural material, in particular for a ceramic body used as an implant, such as a dental implant.

However, when preparing an implant, the ceramic material is typically subjected to a subtractive treatment in order to roughen the surface for achieving improved osteointegrative properties. Particularly, the implant is often subjected to grinding or sandblasting, by which treatment the martensitic transformation is promoted due to the stress applied to the material. Further, the implant is often subjected to an etching treatment which further promotes the martensitic transformation.

Although the transformation from the tetragonal to the monoclinic phase can lead to positive effects, namely an improved flexural strength owed to the volume expansion, the material loses its ability to respond to induced stresses, such as cracks, due to the inability of the monoclinic phase to undergo the martensitic transformation.

Although back-transformation from the monoclinic to the tetragonal phase can be induced, e.g. by heat treatment, there is a risk that the volume decrease accompanying the back-transformation leads to the formation of cracks which adversely affect the mechanical strength of the body.

Considering these drawbacks of existing ceramic materials, the problem of the present invention is thus to provide a body based on zirconia which combines both an enhanced flexural strength with the ability for martensitic transformation and thus the intrinsic ability to respond to induced stress, namely to close cracks and/or to countervail crack propagation in the body.

In view of the use of the body as a dental implant, these effects shall also be achieved when subjecting it to a roughening treatment, particularly including a subtractive mechanical treatment and acid etching.

The problem is solved by the body according to claim 1. Preferred embodiments are subject of the dependent claims. According to independent claim 1, the body comprises a surface region and a core region integrally formed with said surface region.

In other words, the surface region and the core region are formed in a continuous material formation. There is, thus, no discrete interface between the core region and the surface region, as it would be the case if the surface region is in the form of a discrete layer or coating applied on the core region.

In the surface region, the ceramic material comprises a crystalline phase A formed by zirconia in tetragonal phase. Due to the presence of this phase, the material retains its ability for undergoing martensitic transformation and thus to close cracks and/or to countervail crack propagation in the body.

In addition to crystalline phase A, the ceramic material surface region further comprises crystalline phase B, the crystal structure of which comprising apart from zirconium and oxygen at least one further component X in a periodic arrangement, said crystalline phase B having a lower theoretical density than crystalline phase A.

Typically, the ceramic material is yttria-stabilized zirconia. In this regard, the term "yttria-stabilized zirconia" encompasses—besides purely yttria-stabilized zirconia—any yttria-stabilized zirconia that is co-stabilized with a co-stabilizing agent, such as cerium, magnesium, calcium, strontium, ytterbium, gadolinium and/or neodymium or their respective oxides.

Apart from yttria-stabilized zirconia, also ceria-stabilized, magnesia-stabilized or calcia-stabilized zirconia are thinkable and also encompassed by the term "ceramic material" according to the present invention.

As will be discussed in detail below, component X is typically brought into the ceramic material by way of diffusion at elevated temperatures.

The amount of component X in the surface region is chosen such that crystalline phase B is formed. In this regards, it is important to note that in the crystal structure of crystalline phase B, component X is arranged periodically, meaning that it occupies a defined position within the crystal lattice system. This is in contrast to a mere stabilizing agent, i.e. an agent that serves to stabilize the crystal structure of a given phase, but which is not arranged periodically within the crystal lattice system. It is understood that some components, such as calcium, can act both as component X, i.e. being arranged periodically within the crystal structure of crystalline phase B, as well as a stabilizing agent, depending on its content in the material.

According to claim 1, crystalline phase B has a lower theoretical density than crystalline phase A (formed by zirconia in tetragonal phase). Consequently, the formation of crystalline phase B goes along with a volume increase with respect to the volume of crystalline phase A, thus building up a compressive stress within the surface region which ultimately results in an increased fracture toughness and an increased flexural strength of the body.

Preferably, the theoretical density of crystalline phase B is also lower than the one of zirconia in monoclinic phase. Thus, even after back-transformation from the monoclinic phase to the tetragonal phase, an increase in the flexural strength of the body can be achieved by the presence of crystalline phase B.

In addition to the increased flexural strength achieved by the present invention, an improvement in the hydrothermal stability can be achieved, due to the fact that in the surface region at least a portion of the tetragonal phase, which intrinsically has a relatively high tendency for low temperature degradation, is transformed into a phase of higher hydrothermal stability.

As will be discussed in more detail below, the technical effect achieved by the present invention is of particular relevance in connection with the so-called "restabilisation" technology described in EP-A-2371344, since this technology aims at (re-)stabilizing the tetragonal phase of zirconia. The present invention thus allows combining the advantages of the restabilisation technology, namely a very high hydrothermal stability, with an increased flexural strength obtained by the formation of crystalline phase B having a lower theoretical density than zirconia in tetragonal phase.

As a rule, the proportion of crystalline phase B in the surface region is higher than the proportion of crystalline phase B in the core region.

The term "proportion" as used in the context of crystalline phase B relates to the volume percentage of crystalline phase B relative to the total volume of the respective region.

A suitable method for determining the content or proportion of crystalline phase B includes X-ray diffraction (XRD) which is well known to the skilled person and which will be discussed in detail by way of the examples.

Specifically, crystalline phase B is only present in the surface region. Thus, the other mechanical properties of known zirconia ceramics—apart from the flexural strength—can be kept essentially unchanged.

According to a preferred embodiment, separate areas of crystalline phase B are dispersed within the surface region. These areas thus form islands of crystalline phase B surrounded by material of a different phase, specifically of zirconia in tetragonal phase. In this embodiment, crystalline phase B does, thus, not form a continuous layer; the risk of material splitting off from the remainder of the body due to strain incompatibilities is thus reduced.

The areas can have a dimension in the range of the grain size or even be lower in dimension, thus allowing for a particularly fine dispersion within the surface region.

More specifically, the proportion of crystalline phase B in the ceramic material decreases continuously in direction from the surface of the body towards the core region. This results in a gradual change of compressive stress built up by the formation of crystalline phase B; no strain incompatibilities that might adversely affect the overall stability of the body are thus generated.

The above mentioned embodiment, in which the proportion of crystalline phase B in the ceramic material decreases continuously in direction from the surface of the body towards the core region, also includes embodiments of the body, in which the decrease starts from a given depth and having in its outermost region a constant proportion of crystalline phase B.

Like the continuous decrease in the proportion of crystalline phase B, also the proportion of component X in the ceramic material decreases continuously in direction from the surface of the body towards the core region. When using calcium or calcium oxide as component X, said component not only serves for forming crystalline phase B, but in regions, where the amount of component X is insufficient for the formation of said crystalline phase, still acts as a stabilizing agent for stabilizing the zirconia crystal structure.

According to a preferred embodiment, the surface region extends from the surface of the body to a depth of at least 5 nm, preferably at least 10 nm, more preferably at least 30 nm, most preferably at least 50 nm.

It is further preferred that the surface region extends from the surface of the body to a depth of at most 10 μm, preferably at most 8 μm (micrometer), more preferably at most 6 μm (micrometer), most preferably at most 5 μm (micrometer).

More preferably, the surface region thus extends from the surface of the body to a depth ranging from 5 nm to 10 μm, more preferably from 10 nm to 8 μm, more preferably from 30 nm to 6 μm and most preferably from 50 nm to 5 μm.

As mentioned, the theoretical density of crystalline phase B is lower than the theoretical density of crystalline phase A (having a theoretical density of about 6.1 g/cm$^3$, specifically 6.07 g/cm$^3$), and preferably lower than the one of the zirconia in monoclinic phase (having a theoretical density of about 5.9 g/cm$^3$, specifically 5.82 g/cm$^3$). Specifically, the theoretical density of crystalline phase B is thus lower than about 6.1 g/cm$^3$, preferably lower than 6.07 g/cm$^3$, more preferably lower than 6 g/cm$^3$, even more preferably lower than about 5.9 g/cm$^3$, and most preferably lower than 5.82 g/cm$^3$.

As mentioned, calcium or calcium oxide, respectively, is preferably used as component X. It has been shown that by using calcium, not only an increased flexural strength of the body can be achieved, but that also the hydrophilicity of the body's surface can be improved, which is of particular relevance in view of a use of the body as an implant, and more particularly as a dental implant. Also, the use of calcium or calcium oxide has been shown to result in an improved resistance to hydrothermal ageing.

It is particularly preferred that the calcium containing crystalline phase is a Ca—Zr—O phase, i.e. a phase the crystal structure of which contains calcium, zirconium and oxygen only. It is especially preferred that the calcium containing crystalline phase is a CaO—ZrO$_2$ phase (also referred to as calcium zirconate phase), and more preferably is selected from the group consisting of a monoclinic CaZr$_4$O$_9$ phase, a cubic CaZrO$_3$ phase and an orthorhombic CaZrO$_3$ phase. It is thereby particularly preferred that the calcium containing crystalline phase is an orthorhombic CaZrO$_3$ phase, since the presence of this phase has been shown to go along with a specifically high hydrothermal stability. Other crystalline phases B of particular interest include CaZrO$_3$, particularly cubic CaZrO$_3$ (having a theoretical density of about 4.5 g/cm$^3$) and orthorhombic CaZrO$_3$ (having a theoretical density of 4.65 g/cm$^3$), Ca$_{0.2}$Zr$_{0.8}$O$_{0.8}$ (having a theoretical density of about 5.16 g/cm$^3$), and CaZr$_4$O$_9$, specifically monoclinic CaZr$_4$O$_9$ (having a theoretical density of 5.4 g/cm$^3$).

For an orthorhombic CaZrO$_3$ phase to be formed, a relatively high amount of calcium or its oxide, respectively, in the surface region is required.

In this regard, it is preferred that the amount of calcium oxide in the surface region preferably ranges from about 3 mol-% to about 50 mol-%, more preferably from about 6 mol-% to about 50 mol-%, and most preferably from about 15 mol-% to about 30 mol-%. In this context, mol-% refers to the number of calcium oxide versus the sum of calcium oxide and zirconia of the material of the surface region.

The $CaO$—$ZrO_2$ crystalline phase can further contain minor amounts of yttrium and/or hafnium, as known to the skilled person. It is understood that these crystalline phases are also encompassed by the terms "Ca—Zr—O phase" and "$CaO$—$ZrO_2$ phase".

Additionally or alternatively, any other component X can be used, which is able to form—based on zirconia in tetragonal phase—a crystalline phase B of lower density. In this regard, it is generally preferred that this additional or alternative component X has a charge density enabling it to compensate respective vacancies in the crystal lattice system. Also, component X shall be chosen such that the body of the present invention comprising crystalline phase B is biocompatible.

Preferably, component X or its oxide, respectively, is such that—based on zirconia—it forms a zirconate phase. More preferably, component X is selected from the group consisting of calcium, magnesium, titanium, silicium, strontium, cerium and sodium and their respective oxides, as well as mixtures thereof. In this regard, crystalline phase B can e.g. be selected from the group consisting of $ZrSiO_4$ (theoretical density of about 4.64 g/cm$^3$), $ZrTiO_4$ (theoretical density of about 5.12 g/cm$^3$) and $(Zr_{0.42}Ti_{0.5})O_2$ (theoretical density of about 4.93 g/cm$^3$). It is understood that the crystal structure of crystalline phase B can besides zirconia and oxygen comprise more than one further component X, as it is e.g. the case when crystalline phase B is $Ca_3ZrSi_2O_9$.

As mentioned, the technical effect achieved by the present invention is of particular relevance in connection with the so-called "restabilisation" technology by which in the surface region the tetragonal phase of zirconia is stabilized by an enrichment in the stabilizing agent.

According to a particularly preferred embodiment, the proportion of the stabilizing agent, and particularly yttrium, in the ceramic material is, thus, higher in the surface region than in the core region. Throughout the body, the proportion of the stabilizing agent, in particular yttrium, is chosen such that the tetragonal phase is stabilized.

The term "proportion" as used in the context of the component X or the stabilizing agent relates to the atomic percentage or molar percentage of the component or the stabilizing agent, respectively, in atomic or oxidic form, respectively, relative to the total number of atoms or molecules, respectively, of the ceramic material.

Apart from yttrium, at least one further co-stabilizing agent can be used, the proportion of which being preferably also higher in the surface region than in the core region. Specifically, this co-stabilizing agent can be selected from the group consisting of cerium, magnesium, strontium, calcium, aluminium, indium, lanthanum, scandium, ytterbium, gadolinium, neodymium as well as their respective oxides, and mixtures thereof.

Given the achieved "restabilization" of the tetragonal phase, the proportion of monoclinic phase is in the surface region of these embodiments less than 25%, preferably less than 20%.

The increase in the proportion of yttrium is generally also effected by diffusing yttrium or yttria, respectively, into the ceramic material at elevated temperatures. In analogy to what has been said above in connection with component X, this results in a ceramic material in which the proportion of yttrium decreases continuously in direction from the surface of the body towards the core region.

As mentioned, the body of the present invention is preferably used as an implant, particularly a dental implant. In view of this use, the body preferably has a roughened surface, allowing it to be provided with properties which allow a good interaction with the surrounding tissue, and specifically highly osteointegrative properties. Despite the harsh treatment usually applied to the body to obtain a roughness, the present invention now allows to stabilize the tetragonal phase, while simultaneously also providing an increased flexural strength to the body.

According to a particularly preferred embodiment, the surface topography is defined by the arithmetic mean height Sa (3D roughness parameter) being in a range from 0.1 µm and 1.7 µm, preferably being in a range from 0.3 µm to 0.9 µm, more preferably from 0.5 µm to 0.75 µm. Methods for determining Sa are well known to the skilled person; an exemplary description of its determination is further given below.

It has been found that for a body made of a ceramic material, a particularly strong interaction with the surrounding tissue, specifically the bone tissue, can be achieved if the surface topography falls within the above definition.

Preferably, the surface topography is further defined by the skewness of the height distribution $S_{sk}$ (3D roughness parameter) being in a range from −0.6 to 0.6, preferably from −0.4 to 0.6, more preferably from −0.3 to 0.5. Methods for determining $S_{sk}$ are well known to the skilled person; an exemplary description of its determination is further given below.

Preferably, the surface topography is further defined by a developed surface area Sdr being in a range from 5% to 40%, preferably in a range from 10% to 30%. Sdr is measured in % enlargement compared to a totally plane reference area which equals to the measured area. Sdr is in the art also referred to as interfacial area and methods for its determination are well known to the skilled person.

As mentioned, the determination of surface topography parameters is well known to the skilled person.

According to one specific example, measurement is carried out using a confocal microscope (surf explorer, Nano-Focus AG, Oberhausen, Germany) with the following specifications:

Light source: green LED (wavelength 505 nm);
Scan mode: piezoelectric scanner; 0.59 µm interval between subsequent images of the image stack;
Object lens: 20× (working distance 3.1 mm, numerical aperture 0.45);
Field of view: 798 µm×798 m (512×512 data points); and
Lateral resolution: 1.56 µm; and
Ultimate vertical resolution: 5 nm.

The roughness parameter can for example be determined using the following:

Software: WinSAM, Version 2.6.07 (University of Erlangen-Nürnberg);
Filter: Moving-average Gaussian filter with a cut-off wavelength of x=31 µm, y=30 µm (20×19 image points), subsequent plane subtraction; and
KFL-analysis: Limits from the amplitude density, 10 nm increments.

According to a further aspect, the present invention shall also provide a process which allows the flexural strength of a basic ceramic body based on zirconia to be increased in a controlled manner, while simultaneously maintaining the material's ability for undergoing martensitic transformation.

This problem is solved by the process according to claim 16, the preferred embodiments of this process being defined in the claims dependent on claim 16.

According to claim 16, the present invention thus also relates to a process for preparing a body described above, said process comprising the steps of:

a) applying component X and/or a precursor thereof onto the surface of a basic ceramic body made of zirconia; and
b) thermally treating the basic ceramic body with the component X and/or the precursor applied thereon at a temperature of at least 500° C., whereby component X diffuses into the basic ceramic body in an amount sufficient to form crystalline phase B.

The basic ceramic body is typically prepared by a sintering process. Sintering processes for achieving a ceramic body, and in particular a ceramic dental implant, are well known to a skilled person.

The specific method of application of component X and/or a precursor thereof onto the basic ceramic body depends on the specific component used and can be carried out in any manner which the skilled person, who has come aware of the present invention, considers suitable. Typically, suitable methods include soaking/immersion, dipping or drop casting into a respective suspension or emulsion, a sol-gel-process, by a process using a slurry, embedding into powder, spin coating, electrophoresis, sandblasting, chemical vapour deposition, physical vapour deposition, atomic layer deposition and/or ion implantation, in particular plasma immersion ion implantation (PIII).

Likewise, also the specific temperature to be applied as well as the duration of the thermal treatment depends on the specific component used, and a skilled person, who has come aware of the present invention, knows how to set these parameters.

As mentioned, calcium or calcium oxide is preferably used as component X. In view of this, it is particularly preferred that in step a) calcium or a calcium containing substance selected from the group consisting of a calcium salt, calcium oxide, calcium hydroxide, metallic calcium and a calcium containing gel is applied onto the surface of the basic ceramic body. Specifically, the term "calcium salt" thereby includes those salts comprising an anion that is instable, e.g. against temperature, water, air, etc., like e.g. $Ca(HCO_3)_2$.

More preferably, the calcium containing substance that is applied onto the surface of the basic body is selected from the group consisting of CaO, CaCO3, $Ca(HCO_3)_2$, $Ca(NO_3)_2$, and mixtures thereof.

As also mentioned, the application of the calcium compound can be carried out by e.g. soaking/immersion, dipping or drop casting into a respective suspension or emulsion, by a sol-gel-process, by a process using a slurry, by embedding into powder, e.g. when using $CaCO_3$, by spin coating, electrophoresis, sandblasting, chemical vapour deposition, physical vapour deposition, atomic layer deposition and/or ion implantation, in particular by plasma immersion ion implantation (PIII).

It has been found that by applying a sol-gel-process or a process using a slurry, a particularly high amount of calcium or calcium oxide diffusing into the body can be achieved.

When using calcium or calcium oxide as component X, the temperature according to step b) is typically set higher than 500° C., preferably higher than 800° C., more preferably higher than 900° C. The specific temperature is dependent on the specific calcium compound applied, and is typically above the decomposition temperature of the respective calcium compound.

As also mentioned, diffusion of component X, specifically calcium (or calcium oxide), and/or its precursor, together with a stabilizing agent, specifically yttrium (or yttria), is particularly preferred. It is thus particularly preferred that in addition to component X a stabilizing agent, specifically yttrium and/or yttria, is applied onto the surface of the basic ceramic body, said stabilizing agent diffusing into the basic ceramic body by thermal treatment.

In this context, component X or its precursor, respectively, and the stabilizing agent can be applied in two separate steps or simultaneously.

If they are applied in two separate steps, the stabilizing agent can either be applied before or after applying component X or its precursor.

Further, they can be applied by different methods of application. For example, the stabilizing agent, specifically yttrium, can be applied by physical vapour deposition, followed by the application of component X, specifically calcium, and/or its precursor by soaking/immersion into a respective suspension.

It is further possible to apply either one of component X (and/or its precursor) and the stabilizing agent in a first step, followed by a first thermal treatment in order to let it diffuse into the ceramic basic body in a second step, then apply the other one of component X (and/or its precursor) and the stabilizing agent, i.e. the one not applied in the first step, in a third step, followed by a second thermal treatment in order to let it diffuse into the ceramic basic body in a fourth step. In this regard, the temperature of the first thermal treatment and the temperature of the second thermal treatment can be different.

Most surprisingly, it has been found that by using both calcium (or calcium oxide) and yttrium (or yttria) in the process, calcium/calcium oxide diffuses deeper into the ceramic material than if no yttrium/yttria is co-diffused.

In view of its use of an implant, the process of the present invention further comprises the step of roughening at least a part of the surface of the basic body by a subtractive treatment before applying component X and/or the precursor.

It has surprisingly been found that by the process of the present invention, the surface topography of the (basic ceramic) body remains unaltered or is altered in a very minor manner; the good interaction with the surrounding tissue, and in particular the high osteointegrative properties achieved by the surface roughening are thus not affected by the process of the present invention.

It is particularly preferred that the subtractive treatment comprises an etching step.

More particularly, the etching step is carried out with an etching solution comprising hydrofluoric acid at a temperature of at least 70° C. By this treatment, discrete grains or agglomerates of grains are removed from the bulk ceramic material, whereby a surface having recesses and cavities is formed, thus leading to a "microscopic" surface roughness. A detailed description of this etching step is given in EP-A-1982670, in particular paragraphs [0024] to [0030], [0060] to [0064] and [0079] to [0081], the disclosure of which is hereby incorporated by reference.

It is further preferred that the subtractive treatment further comprises a subtractive mechanical step, specifically a sandblasting step, prior to the etching step. Thereby, a "macroscopic" surface roughness is obtained, which in combination with the "microscopic" surface roughness mentioned above further contributes to the high osteointegrative properties of the body. The optional subtractive mechanical step, specifically the sand-blasting step, is in particular preferred when a highly osteointegrative surface topography is to be obtained.

As mentioned, the body of the present invention is prepared using a sintering process. It is in this regard thinkable that method step a), i.e. the application of the component X or its precursor, is performed on the (pre-sintered) white body, which is afterwards subjected to the final sintering temperature and thus simultaneously also to the thermal treatment according to step b).

This process is particularly suitable if a great depth of diffusion is to be achieved.

According to a further preferred embodiment of the invention, the thermal treatment is followed by cleaning the dental implant of non-specifically bonded, residual compounds. This cleaning step is preferably performed by rinsing the dental implant with pure water or an aqueous solution like e.g. NaCl solution, or another liquid. In particular if the calcium compound applied is in solid form, e.g. as $CaCO_3$ powder, other cleaning methods, such as air streaming, brushing and/or polishing can be performed for the removal.

The performance of the washing step can be improved by using ultrasound or acid cleaning for cleaning the residual surface layer by removing material that did not diffuse into the ceramic material. In other words, grains, grain agglomerates or reaction products which loosely adhere to the surface are thereby effectively removed.

In view of the process described above, the present invention also relates to a body obtainable by said process.

In addition, all preferred features mentioned for the body of the present invention likewise apply to the process of the present invention and vice versa.

As mentioned above, the object achieved by the present invention is particularly useful in the field of implantology, in particular in oral implantology. The present invention thus further relates to the use of the body as an implant, in particular a dental implant.

The present invention likewise relates to the use of the body as an abutment for such an implant. All features and advantages mentioned above for an implant, in particular a dental implant, likewise apply to an abutment.

With regard to the process of the present invention described above, this process allows the basic ceramic body to be provided with an increased fracture toughness and an increased flexural strength owed to the volume expansion achieved by the formation of crystalline phase B. The present invention thus also relates to the use of this process for increasing the fracture toughness of a basic ceramic body as well as to the use of the process for increasing the flexural strength of a basic ceramic body.

It has been found that maximum increase in fracture toughness and flexural strength, respectively, can in particular be seen for a body, the surface region of which comprising at least one calcium containing crystalline phase in a total proportion of up to about 25%, more particularly up to about 20%, specifically when being determined by XRD, more specifically using a Cu-tube with 40 kV and 40 mA and applying a Bragg-Brentano geometry and a theta-theta scan ("gonio"), the angle range being from 20° to 80°.

Beyond these proportions, only a minor increase in fracture toughness (or no increase at all) is often observed, meaning that at the mentioned proportions saturation is reached. According to a further preferred embodiment, the proportion of crystalline phase B, and in particular of the at least one calcium containing phase, in the surface region is, thus, in total about 25% at most, more particularly about 20% at most.

The present invention is further illustrated by way of the following examples:

EXAMPLES

Sample Preparation
Sample 1

Discs of yttria-stabilized zirconia (Y-TZP) having a machined surface, a thickness of about 1 mm and a diameter of about 5 mm were sand-blasted and subsequently treated with a HF etching solution comprising concentrated hydrofluoric acid (HF, 40%) at elevated temperature.

The discs were then provided with a thin layer of yttria (about 20 nm thick) using PVD-sputtering.

A 20 mM solution of $Ca(HCO_3)_2$ was prepared by preparing a 20 mM $Ca(OH)_2$ solution (0.74 g/500 ml), sterile-filtering the latter and introducing $CO_2$ into the solution, upon which the solution becomes turbid ($CaCO_3$) and finally turns again into a clear solution.

20 µl of the $Ca(HCO_3)_2$ was pipetted on the surface of the disc with the layer of yttria applied thereon. Final sintering was then carried out at about 1100° C. for either 2, 12 or 48 hours. The samples were then cooled in air, rinsed using pure water and dried under a stream of argon.

For the measurement of the depth distribution of calcium and calcium containing crystalline phase(s) by XPS (X-ray photoelectron spectroscopy), a sample 1.1 was prepared using 20 mM $Ca(HCO_3)_2$ in analogy to the procedure above, whereby five times 3 µl of the $Ca(HCO_3)_2$ was pipetted on the surface of the disc, each time followed by drying in an oven at 60° C. Directly before the application of $Ca(HCO_3)_2$, the disc was cleaned using oxygen plasma.

A thermal treatment was then carried out at about 1100° C. for 48 hours.

The sample was then cooled in air, rinsed using pure water (5 minutes in an ultrasonic bath, then two times for 5 minutes in a beaker glass) and dried under a stream of argon. For washing away any residuals, the samples were then washed using 20% $HNO_3$, at 90° C., for 10 minutes and then rinsed using pure water (three times in an ultrasonic bath for 5 minutes).

The samples were then cleaned using oxygen plasma and directly afterwards analysed by XPS.
Sample 2

The sample 2 discs were prepared in analogy to sample 1, but calcium was deposited by application of a calcium containing gel onto the surface before sintering.

To this end, a calcium containing gel consisting of $Ca(NO_3)_2$, PVA (polyvinyl alcohol, 20 kD molecular weight) and water was prepared. Specifically, solutions of 20 wt-% PVA and 20 wt-% $Ca(NO_3)_2.4H_2O$ were prepared with water and mixed at a ratio of 1:1. After the oxygen plasma cleaning of the samples, the gel was applied to the discs in a thickness of about 2 mm.

Evaluation Methods
XPS (X-Ray Photoelectron Spectroscopy) Measurements

The chemical composition of the surface composition (outermost 5-10 nm) of sample 1 and sample 2 discs (Y—Ca—$ZrO_2$) was determined by X-ray photoelectron spectroscopy (XPS). Furthermore depth-profiles measurements were carried out to determine the depth distribution of calcium within the top 10'000 nm (10 µm) of the surface.

XPS spectra were acquired on a PhI5000 VersaProbe spectrometer (ULVAC-PHI, INC.) equipped with a 180° spherical capacitor energy analyzer and a multi-channel detection system with 16 channels.

Spectra were acquired at a base pressure of $5*10^{-8}$ Pa using a focused scanning monochromatic Al—Ka source (1486.6 eV) with a spot size of 200 μm. The instrument was run in the FAT analyzer mode with electrons emitted at 450 to the surface normal.

Charge neutralisation utilizing both a cool cathode electron flood source (1.2 eV) and very low energy Ark-ions (10 eV) was applied throughout the analysis.

Depth-profiles were run using the ion gun (model 06-350) with a working distance of 50 mm at 450 to the sample normal. Each sample was ion etched on an area of 2×2 respectively 1×1 mm. Settings of 5 resp. 2 keV Ark-ions with an ion current of 5 resp. 2 μA (measured inside a faraday cup) were used. Spectra were run in scanned mode with a pass energy of 58.7 eV.

All samples were oxygen plasma treated for 2 minutes right prior to the XPS measurements.

For determining the amount of calcium, the Ca LMM Auger peak was used.

Crystal Structure Analysis by X-Ray Diffraction (XRD)

In order to determine the crystal structure, the discs were further analysed by X-ray diffraction (XRD) using a diffractometer of the type Empyrean (PANalytical) in the Θ/Θ-constellation (radiation source: Cu (40 kV/40 mA); range of incidence angle: 20° to 80°; step: 0.026° 2Θ; measuring time per measuring point: 300 s; continuous scan). The samples were measured in the Gonio-modus with an automatic slit. On the diffracted beam side a 0.04 mm soller slit was used as well as a Nickel filter. The analysis was performed with the software HighScore Plus (PANalytical, version 3.0.5) via Rietveld method.

Contact Angle Measurements

Contact angle measurements were performed in order to determine the degree of hydrophilicity or hydrophobicity. The contact angles were determined using a sessile drop test with ultrapure water (EasyDrop DSA20E, Krüss GmbH). The water droplets were dosed using an automated unit and a droplet size of 0.1 μl (microliter) was chosen for the samples. Contact angles were calculated by fitting a circular segment function to the contour of the droplet on the surface.

Surface Roughness Measurements

The "microscopic roughness" (conventionally also referred to as "roughness" strictu sensu) and "macroscopic roughness" (conventionally also referred to as "waviness") of the sample surfaces was evaluated with confocal microscopy (μsurf explorer, NanoFocus AG). The same samples were used for the surface roughness measurements and for the contact angle measurements. For each sample, three probes were measured using a 20× objective with a lateral resolution of 1.56 μm. The surface roughness values were determined on the entire surface image with a size of 798 μm×798 μm.

For the roughness measurements a "Moving Average Gaussian filter" with a cut-off wavelength of 30 μm (x=31 μm, y=30 μm, 20×19 pixels) was used. The determination of the roughness values was done by KFL analysis, limits of the amplitude density and a step width of 10 nm.

The following 3D-roughness parameters were determined and analysed: arithmetic mean roughness (or "arithmetic mean height") $S_a$, topographic depth $S_t$ and skewness $S_{sk}$.

The following measurement parameters have been used: Piezo 0.59 μm, algorithm=standard, search mode=maximized peak, threshold=4, brightness 80%, camera settings: exposure time 40 ms, gain 1.5 dB.

Hydrothermal Aging Analysis

Hydrothermal aging of the samples was simulated according to ISO 13356 procedure by autoclaving them at 135° C., respectively, using an autoclave of the type Systec DE-56.

Assessment of the strength/hardness of the body

Further experiments were carried out for assessing the strength or hardness of the body according to the present invention. To this end, discs of yttria-stabilized zirconia (Y-TZP) having a diameter of about 15 mm were polished on one side (sample 3) and subjected to the following treatment (in accordance to the treatments specifically described for sample 1 and sample 2, but without the step of providing a layer of yttrium):

| Sample No. | Calcium containing component applied | Thermal treatment |
|---|---|---|
| 3.1 | None (reference) | 950° C., 2 h |
| 3.2 | Ca(HCO$_3$)$_2$ | 950° C., 2 h |
| 3.3 | Ca(HCO$_3$)$_2$ | 1150° C., 2 h |
| 3.4 | Calcium containing gel | 1150° C., 2 h |
| 3.5 | Calcium containing gel | 1100° C., 48 h |

Crystal structure analysis by XRD was carried out in analogy to the description above but with the incidence angle ranging between 20° to 80°.

Measurement of the surface fracture toughness was carried out by an instrumented indentation test (Zwick ZHU 2.5) using a Vickers diamond pyramid with an intersect of 136°. A load of 147.2 N was used, the rate of application and relieve of the load being in each case 4.9 N/s. The holding time was set to 30 seconds.

Based on the measurements, indentation hardness $H_{IT}$ and indentation elasticity $E_{IT}$ were determined. The indentation diagonal and the crack length were determined using a reflected-light microscope (Leica DM6000 M) at a 200-fold magnification. Determination of the fracture toughness was carried out using the assumption for the generation of Palmqvist-cracks according to Niihara (Niihara et al.; J. Mater. Sci. Letters 1 (1982), pp. 13-16). Specifically $K_{1C}$, i.e. the critical stress intensity factor, was determined using the following equation:

$$K_{1C} = 0.018 H_{IT} \sqrt{a} (E_{IT}/H_{IT})^{0.4} (c/a-1)^{-0.5},$$

whereby a is half the diagonal of indentation and c=a+l, with l being the crack length.

Results

XPS Measurements

The results of the XPS measurements of sample 1 and 2 discs (Y—Ca—ZrO$_2$) are shown in Table 1.

TABLE 1

| | Zr [at %] | Y [at %] | O [at %] | Si [at %] | F [at %] | Ca [at %] | Y/2 (Zr + Y) [mol %] |
|---|---|---|---|---|---|---|---|
| Sample 1 (Ca(HCO$_3$)$_2$) 1150° C., 2 h | 30.6 | 3.7 | 60.2 | 0.0 | 2.7 | 2.9 | 0.05 |
| Sample 1 1100° C., 12 h | 33.3 | 2.4 | 60.7 | 0.0 | 1.7 | 1.6 | 0.03 |
| Sample 1 1100° C., 48 h | 25.0 | 2.7 | 59.0 | 1.1 | 2.8 | 8.9 | 0.05 |
| Sample 2 (Ca-Gel) 1150° C., 2 h | 22.8 | 1.0 | 58.0 | 0.8 | 3.9 | 13.1 | 0.02 |

TABLE 1-continued

|  | Zr [at %] | Y [at %] | O [at %] | Si [at %] | F [at %] | Ca [at %] | Y/2 (Zr + Y) [mol %] |
|---|---|---|---|---|---|---|---|
| Sample 2 1100° C., 12 h | 22.9 | 0.9 | 57.8 | 0.9 | 4.2 | 13.2 | 0.02 |
| Sample 2 1100° C., 48 h | 21.9 | 0.9 | 57.9 | 0.9 | 3.8 | 13.7 | 0.02 |

The results are further illustrated by way of

FIG. 1 showing a graphical representation of the normalized atomic concentration of the three metals Zr, Y and Ca comprised in sample 1 and sample 2 discs for each different thermal treatment.

As can be seen from Table 1, no carbon was detected on the sample 1 and 2 discs as they were measured directly after having been oxygen plasma cleaned.

The sample 1 discs showed a significantly lower amount of calcium in the surface region (about 3-8 at. %) compared to sample 2 discs (about 13 at. %).

Depth Profile Analysis

The results of the depth profiles of sample 1 and sample 2 discs are summarized in the following figures of which:

FIG. 3A shows a graphical representation of the atomic concentration of the material components in a sample 2 disc obtained by thermally treating the disc with the calcium containing gel applied thereon at 1100° C. for 12 hours in relation to the depth of the disc body;

Figure 4A:
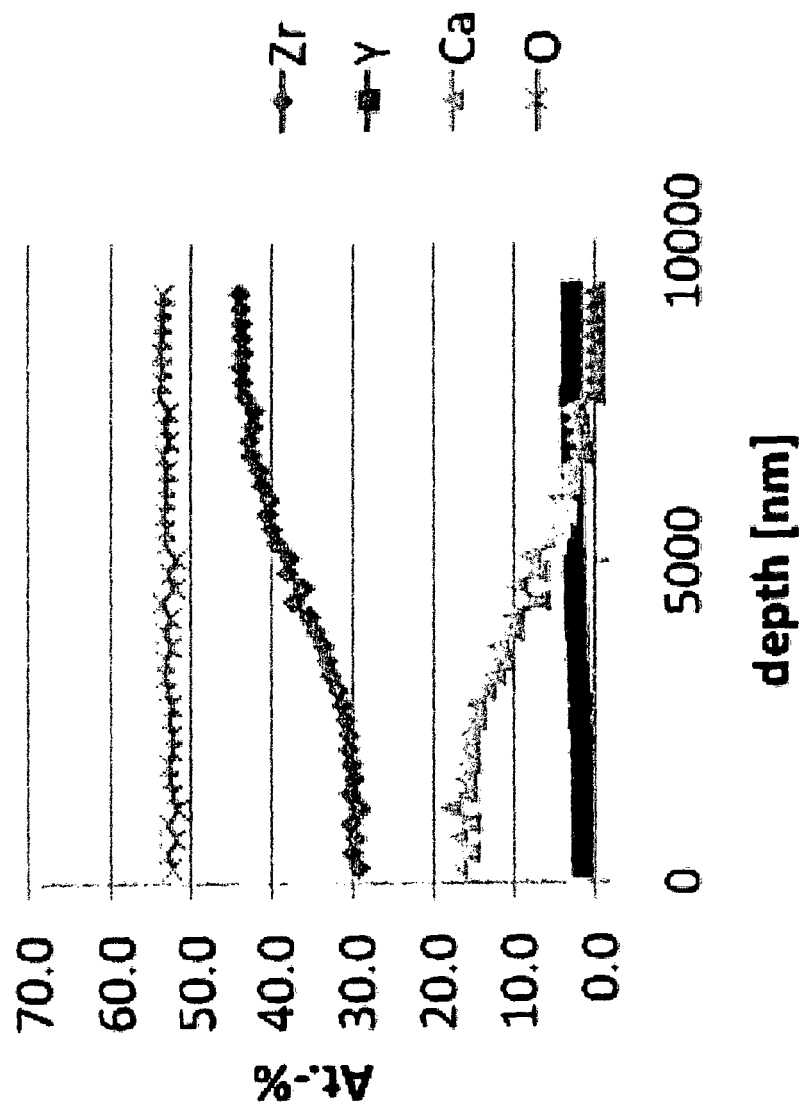
Figure 4B:
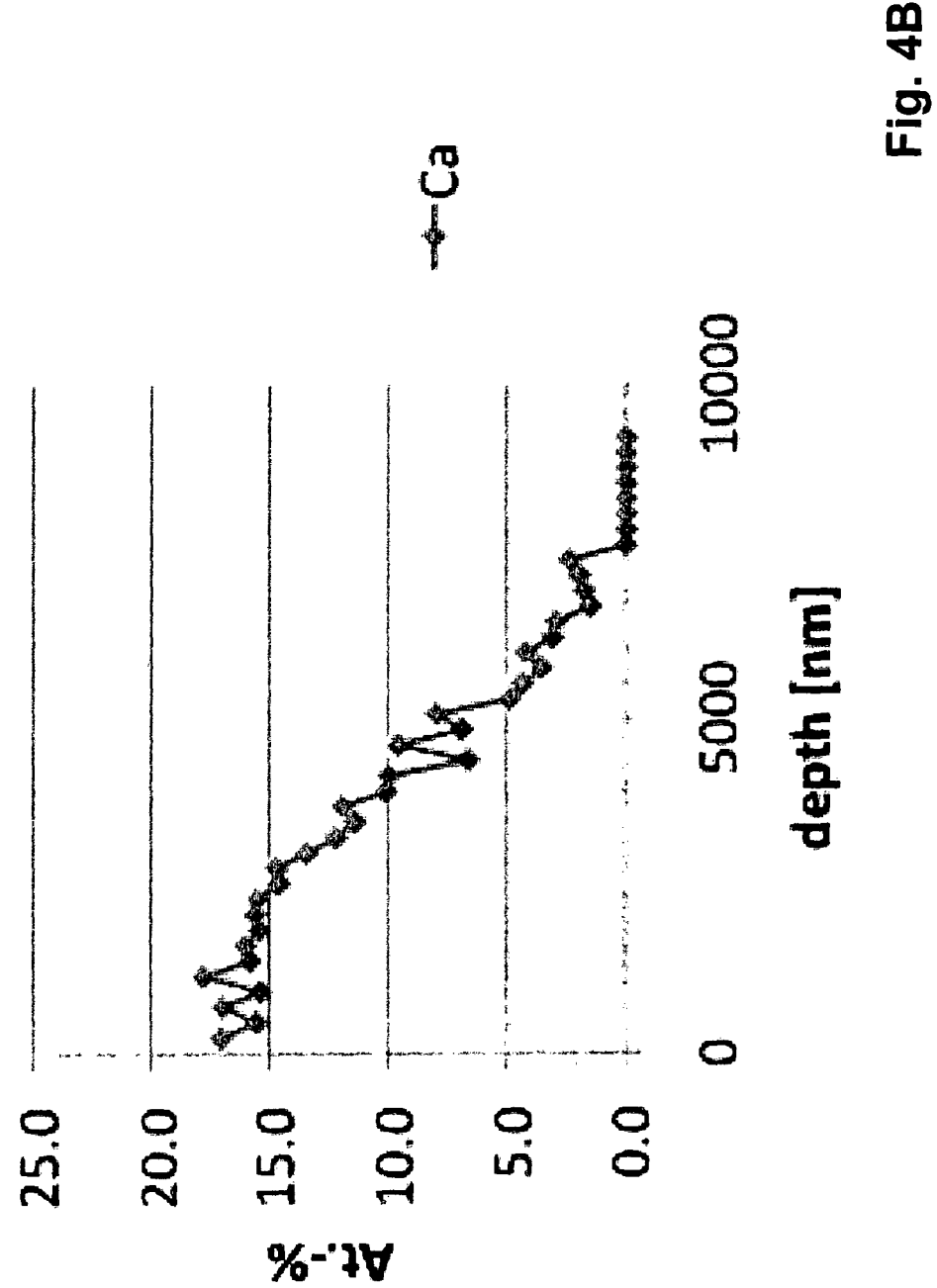

FIG. 4A shows a graphical representation of the normalized atomic concentration of Zr, Y, Ca and O in a sample 2 disc obtained by thermally treating the disc with the calcium containing gel applied thereon at 1100° C. for 48 hours in relation to the depth of the disc body, down to a depth of 10 µm; and FIG. 4B shows a graphical representation of the content of calcium in the material composition of a sample 2 disc described for FIG. 4A in relation to the depth of the disc body, down to a depth of 10 µm.

Figure 1:
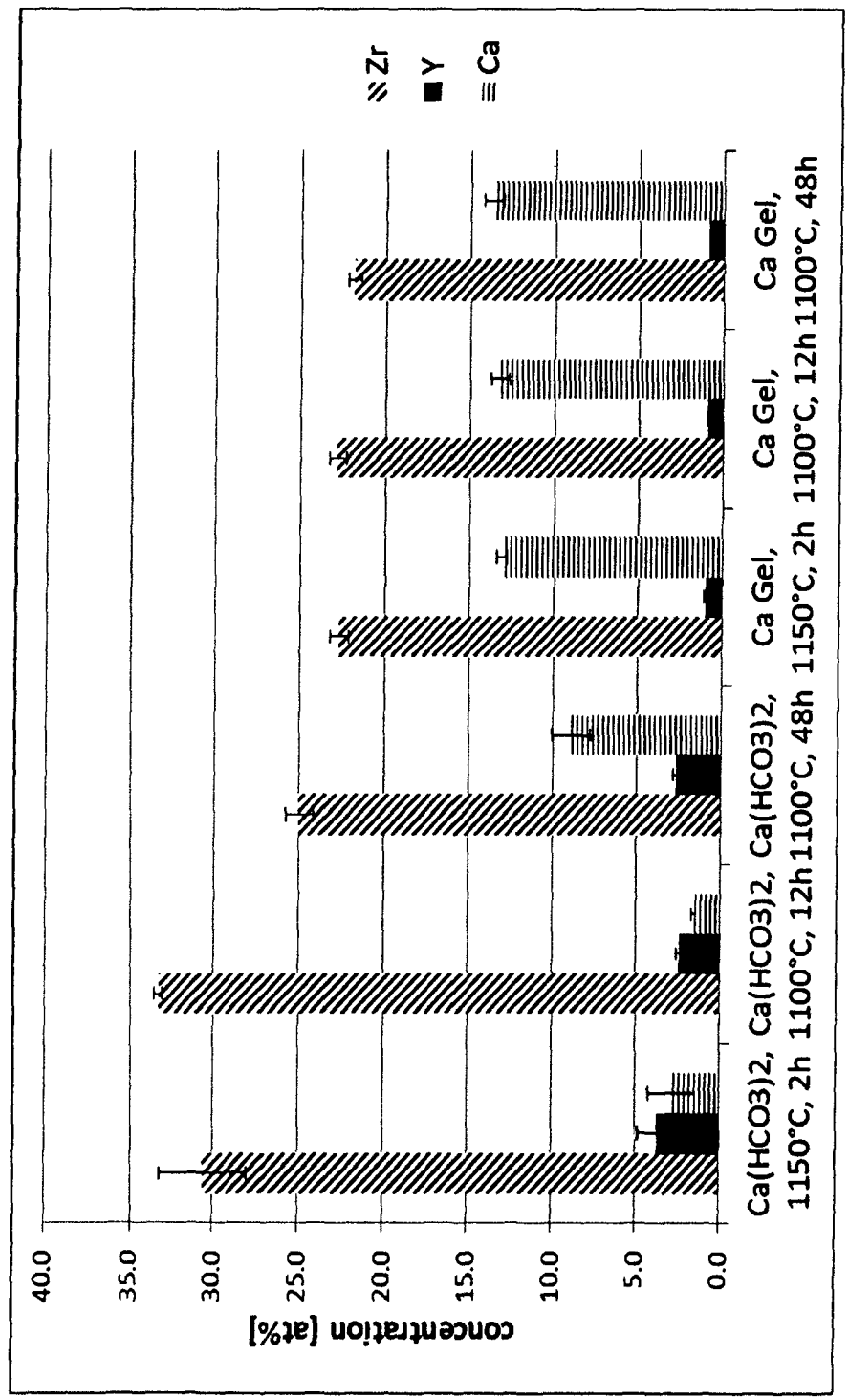
Figure 2A:
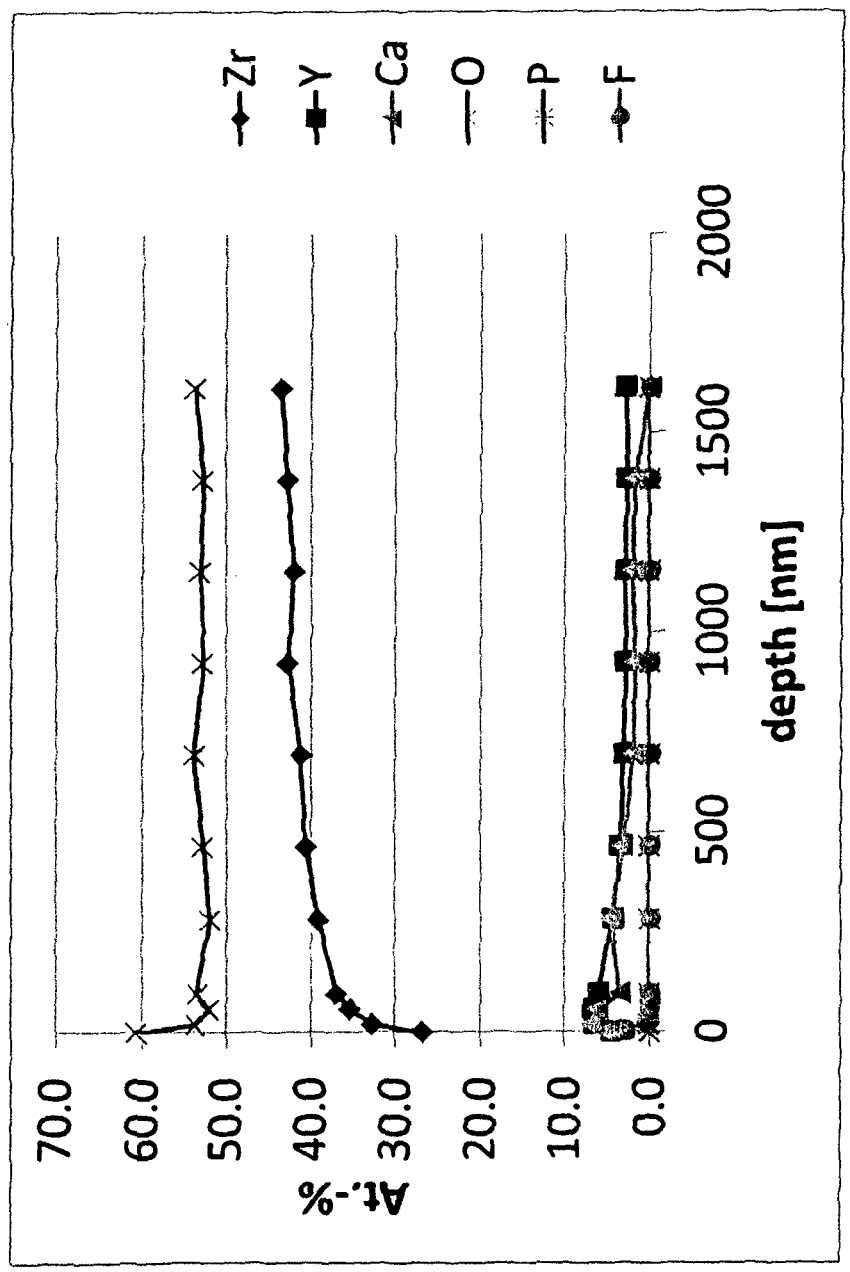
FIG. 2A shows a graphical representation of the atomic concentration of the material components in a sample 1 disc in relation to the depth of the disc body.

The results of the depth profile XPS measurements presented in FIGS. 2A, 3A and 4A show that all samples contained Zr, Y and O as expected.

Figure 2B:
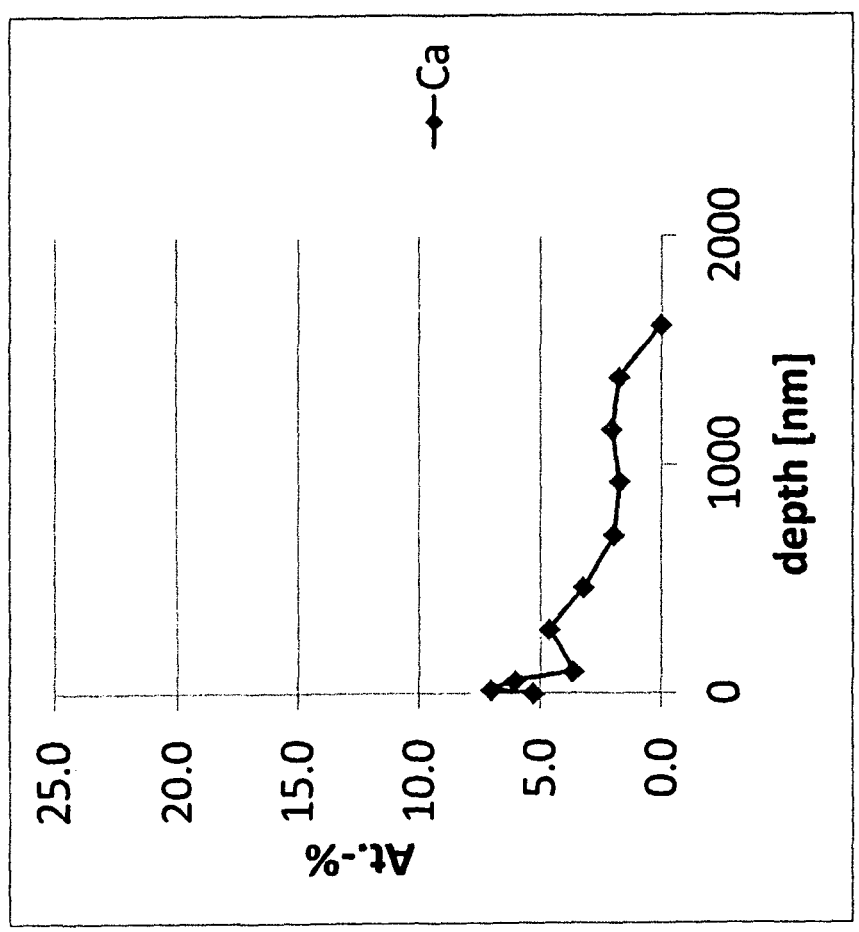
FIG. 2B shows a graphical representation of the content of calcium in the material composition of a sample 1 disc in relation to the depth of the disc body.
Figure 3B:
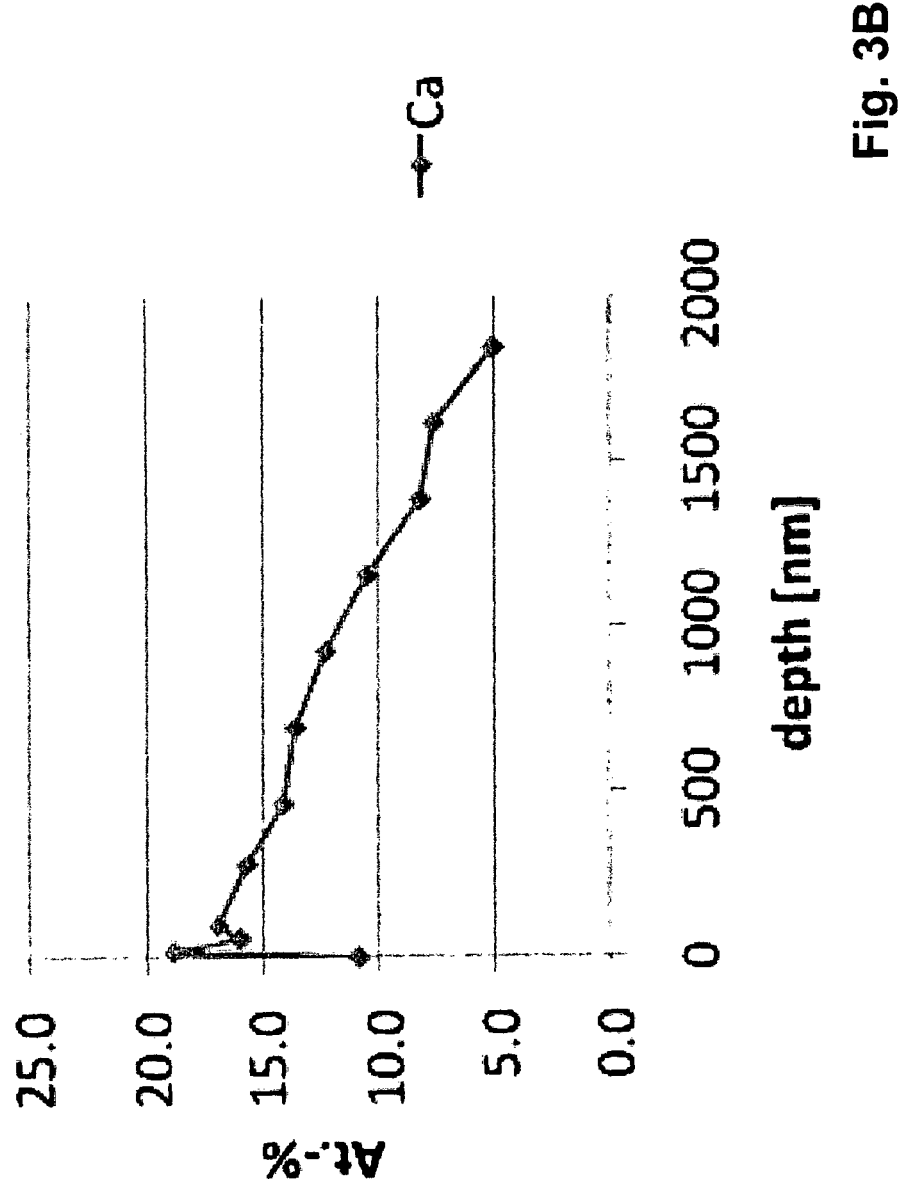
FIG. 3B shows a graphical representation of the content of calcium in the material composition of a sample 2 disc described for FIG. 3A in relation to the depth of the disc body.

As presented in FIGS. 2B, 3B and 4B, calcium diffused into the disc bodies and the calcium concentration decreased more or less linearly with increasing depth from the surface towards the core region.

The diffusion depth was found to be dependent on the surface treatment: In case of a sample 1 disc treated at 1150° C. for 2 hours, the diffusion depth was about 1 µm whereas sample 2 discs that were heated at 1100° C. for 48 hours, calcium diffused into the material down to a depth of 7 µm (FIGS. 2B, 3B). It can therefore be concluded that temperature, time and sort of the calcium treatment influenced the diffusion depth of the calcium. Higher temperatures and longer heat treatment as well as calcium application as a calcium containing gel seemed to increase the diffusion depth of calcium.

Another finding was that the presence of the yttrium-containing layer had a positive influence on the diffusion depth of the calcium. On samples prepared in analogy to sample 1 and sample 2 discs, but without an yttrium-containing layer, calcium was found to diffuse only down to a depth of 300 nm and 900 nm, respectively, compared to about 1000 nm and 2000 nm, respectively, measured for sample 1 and sample 2 discs treated for 2 hours at 1150° C.

Without wanting to be bound by the theory, it is assumed that the additional yttrium present in the material lowers the diffusion barrier in the $ZrO_2$ structure and facilitates the diffusion of calcium into the material.

Crystal Structure Analysis

XRD measurements were also performed to determine the different crystal phases in sample 1 and sample 2 discs. The results are shown in Table 2:

TABLE 2

|  | aging | $ZrO_2$ tetragonal | $ZrO_2$ cubic | $ZrO_2$ monocl. | $CaZrO_3$ ortho-rhromb. |
|---|---|---|---|---|---|
| Sample 1 (Ca(HCO$_3$)2) 1150° C., 2 h | no | 84.9 | 13.4 | 1.5 | 0.2 |
| Sample 1 1100° C., 12 h | no | 85.1 | 13.5 | 1.1 | 0.4 |
| Sample 1 1100° C., 48 h | no | 77.8 | 16.3 | 1.4 | 4.5 |
| Sample 2 (Ca-gel) 1150° C., 2 h | no | 77.7 | 11.3 | 1.3 | 9.7 |
| Sample 2 1100° C., 12 h | no | 73.1 | 10.6 | 1.3 | 15.1 |
| Sample 2 1100° C., 48 h | no | 65.7 | 9.5 | 1.4 | 23.3 |
| Sample 1 1150° C., 2 h | 135° C. 5 h | 78.6 | 11.9 | 9.2 | 0.2 |
| Sample 1 1100° C., 12 h | 135° C. 5 h | 82.2 | 13.2 | 4.4 | 0.2 |
| Sample 1 1100° C., 48 h | 135° C. 5 h | 77.6 | 16.0 | 1.6 | 4.8 |
| Sample 2 1150° C., 2 h | 135° C. 5 h | 77.8 | 11.3 | 1.3 | 9.7 |
| Sample 2 1100° C., 12 h | 135° C. 5 h | 74.2 | 9.6 | 1.3 | 14.9 |
| Sample 2 1100° C., 48 h | 135° C. 5 h | 65.4 | 9.9 | 1.7 | 23.0 |
| Sample 1 1150° C., 2 h | 135° C. 20 h | 51.4 | 14.0 | 34.5 | 0.1 |
| Sample 1 1100° C., 12 h | 135° C. 20 h | 59.9 | 13.3 | 26.3 | 0.5 |
| Sample 1 1100° C., 48 h | 135° C. 20 h | 74.2 | 17.0 | 4.7 | 4.1 |
| Sample 2 1150° C., 2 h | 135° C. 20 h | 74.8 | 11.8 | 5.1 | 8.1 |
| Sample 2 1100° C., 12 h | 135° C. 20 h | 72.3 | 9.6 | 5.0 | 13.1 |
| Sample 2 1100° C., 48 h | 135° C. 20 h | 62.3 | 5.6 | 3.8 | 28.3 |

The results are further shown by way of

Figure 5:
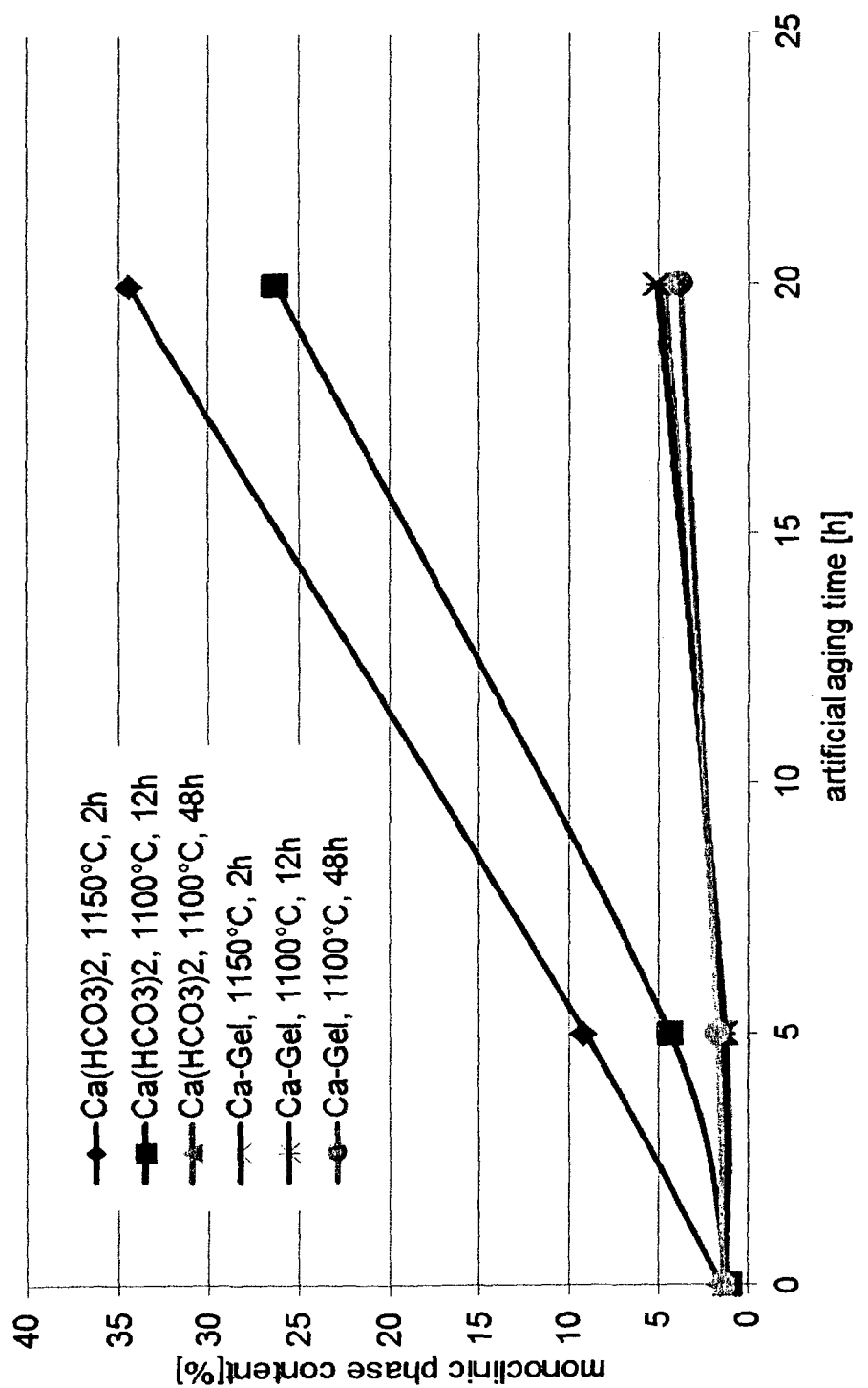

FIG. 5 showing a graphical representation of the content of monoclinic phase as a function of the duration of a simulated aging treatment at 135° C. for sample 1 and sample 2 discs.

As can be seen from FIG. 5, all sample 1 and sample 2 discs showed a content of monoclinic phase below 25% after an simulated accelerated hydrothermal aging at 135° C. for 5 hours. Even after 20 hours, only the sample 1 discs that were treated at 1150° C. for 2 hours and at 1100° C. for 12 hours showed a content of monoclinic phase that was above 25%.

Sample 1 discs treated at 1100° C. for 48 hours and all sample 2 discs showed practically no hydrothermal aging, as shown in FIG. 5.

XRD measurements revealed that new crystal phases developed by calcium diffusing into the material. All of these crystal phases had lower theoretical densities than the known crystal phases of zirconia (cubic, tetragonal, monoclinic).

Contact Angle Measurements

Table 3 gives the contact angles (CA) measured for the surfaces of the samples after having been subjected to different thermal treatments.

TABLE 3

| | treatment | disc 1 CA [°] | disc 2 CA [°] | disc 3 CA [°] |
|---|---|---|---|---|
| Sample 1 (Ca(HCO$_3$)$_2$) | 1150° C., 2 h | 0 | 0 | 0 |
| Sample 1 (Ca(HCO$_3$)$_2$) | 1100° C., 12 h | 0 | 0 | 0 |
| Sample 1 (Ca(HCO$_3$)$_2$) | 1100° C., 48 h | 0 | 0 | 0 |
| Sample 2 (Ca-Gel) | 1150° C., 2 h | 0 | 0 | 0 |
| Sample 2 (Ca-gel) | 1100° C., 12 h | 0 | 0 | 0 |
| Sample 2 (Ca-gel) | 1100° C., 48 h | 0 | 0 | 0 |

As can be seen from Table 3, all samples were ultrahydrophilic independent of the time of thermal treatment.

Surface Roughness Measurements

The microscopic and macroscopic roughness values of the surface topographies on sample 1 and sample 2 discs, treated according to table 3, were determined. The mean values obtained for the respective samples are given in Table 4.

TABLE 4

| | microscopic roughness | | | | | |
|---|---|---|---|---|---|---|
| | $S_a$ [μm] | Std $S_a$ [μm] | $S_t$ [μm] | Std $S_t$ [μm] | $S_{sk}$ [μm] | Std $S_{sk}$ [μm] |
| Sample 1 (Ca(HCO$_3$)$_2$) | 0.465 | 0.128 | 2.85 | 0.76 | −0.123 | 0.032 |
| Sample 2 (Ca-Gel) | 0.505 | 0.700 | 3.10 | 0.58 | −0.140 | 0.038 |

TABLE 5

| | macroscopic roughness | | | | | |
|---|---|---|---|---|---|---|
| | $S_a$ [μm] | Std $S_a$ [μm] | $S_t$ [μm] | Std $S_t$ [μm] | $S_{sk}$ [μm] | Std $S_{sk}$ [μm] |
| Sample 1 (Ca(HCO$_3$)$_2$) | 0.457 | 0.133 | 2.88 | 0.80 | −0.403 | 0.087 |
| Sample 2 (Ca-Gel) | 0.516 | 0.120 | 3.30 | 0.73 | −0.378 | 0.092 |

The results are further illustrated by way of

Figure 6A:
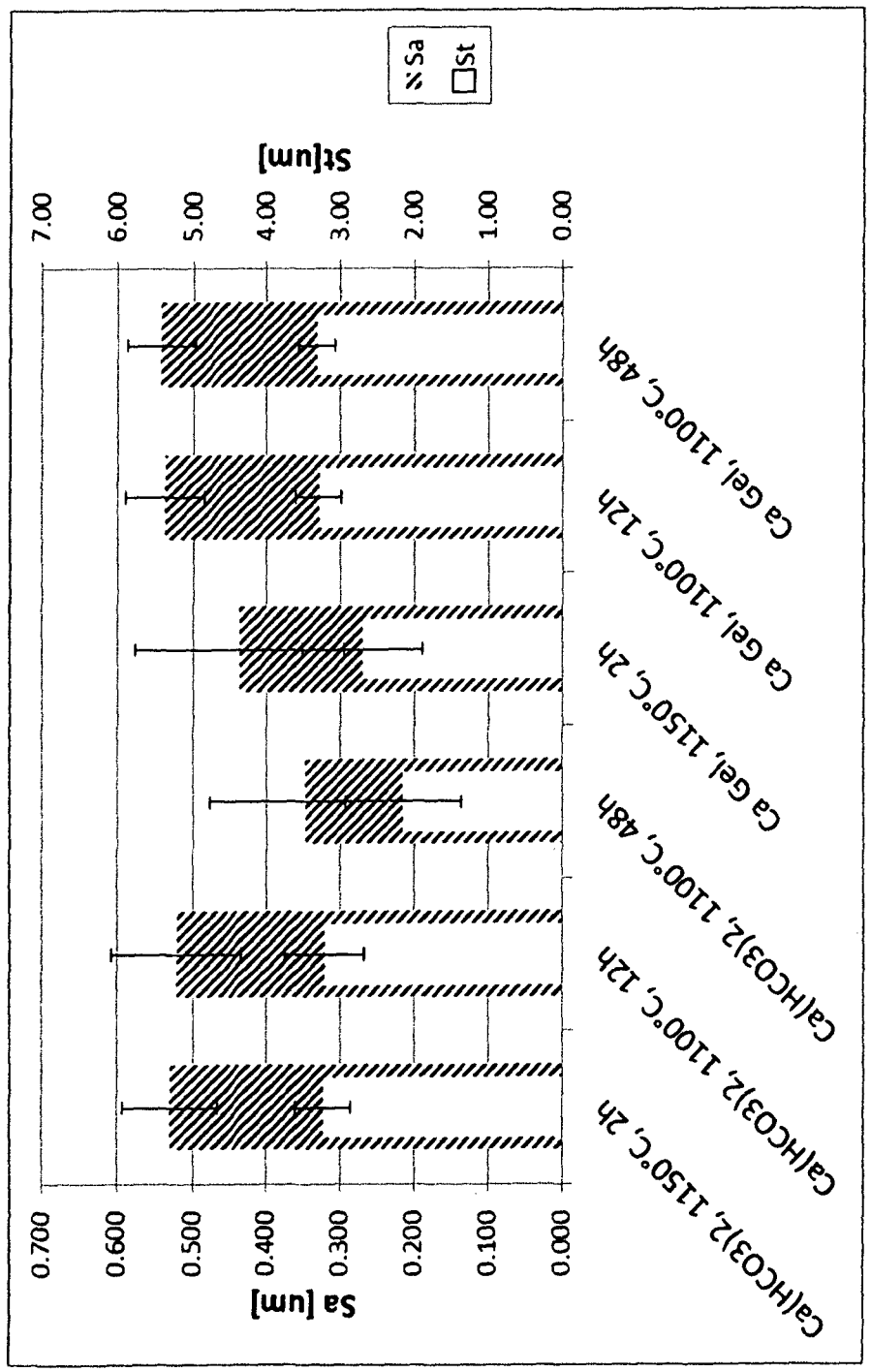
Figure 6B:
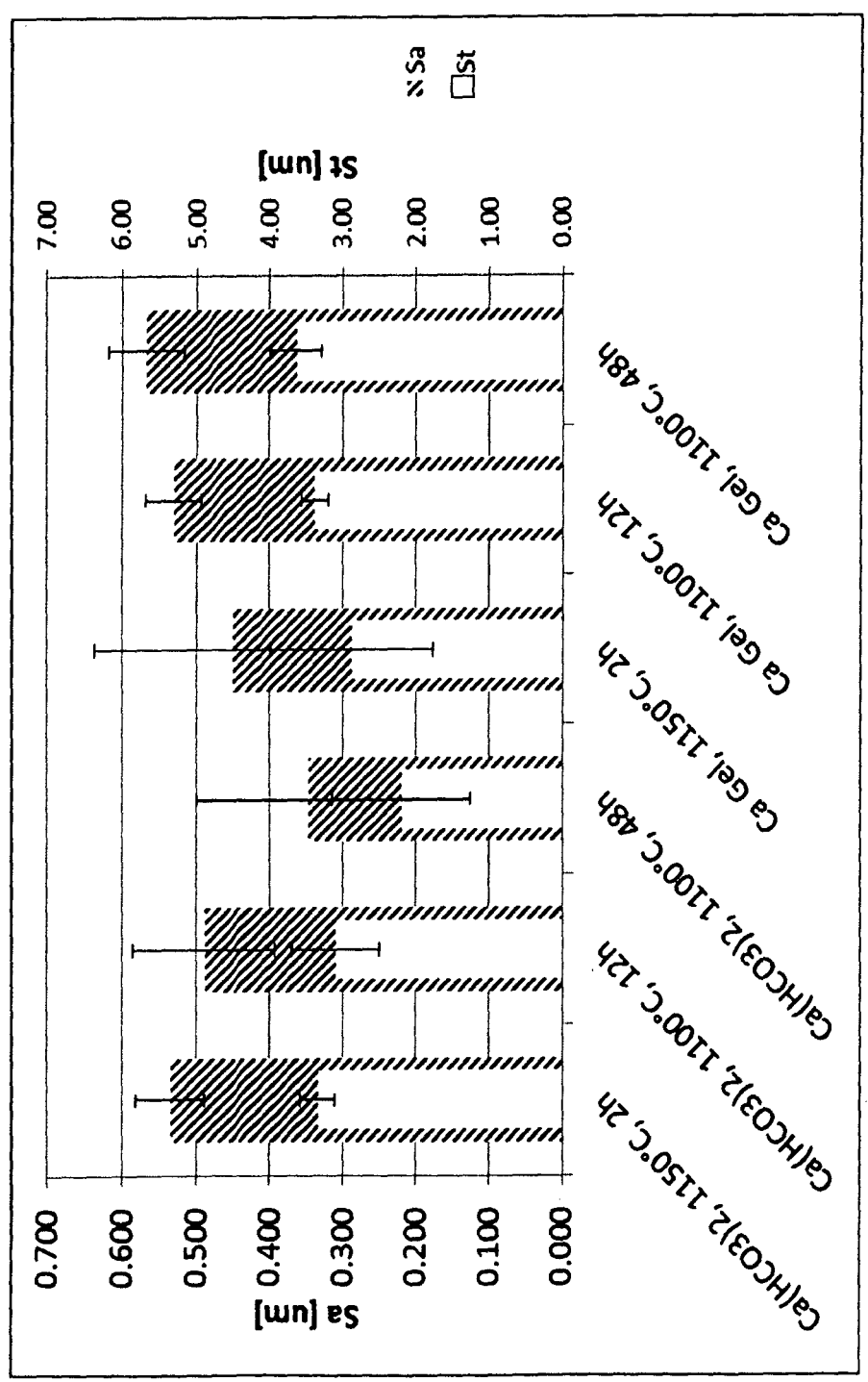

FIG. 6A showing a graphical representation of the measured microscopic roughness values on sample 1 and sample 2 discs; and FIG. 6B showing a graphical representation of the measured macroscopic roughness values on sample 1 and sample 2 discs.

The results show that also when performing the process according to the present invention after the surface roughening treatment, a surface with desirable surface parameters in view of a good osteointegration can be achieved.

Still further to the depth profile analysis mentioned above, the content of calcium in the material composition of a sample 1.1 disc was measured and the proportion of calcium zirconate phase formed was calculated under the assumption that all calcium is present in a calcium zirconate phase.

The results are given in

Figure 7:
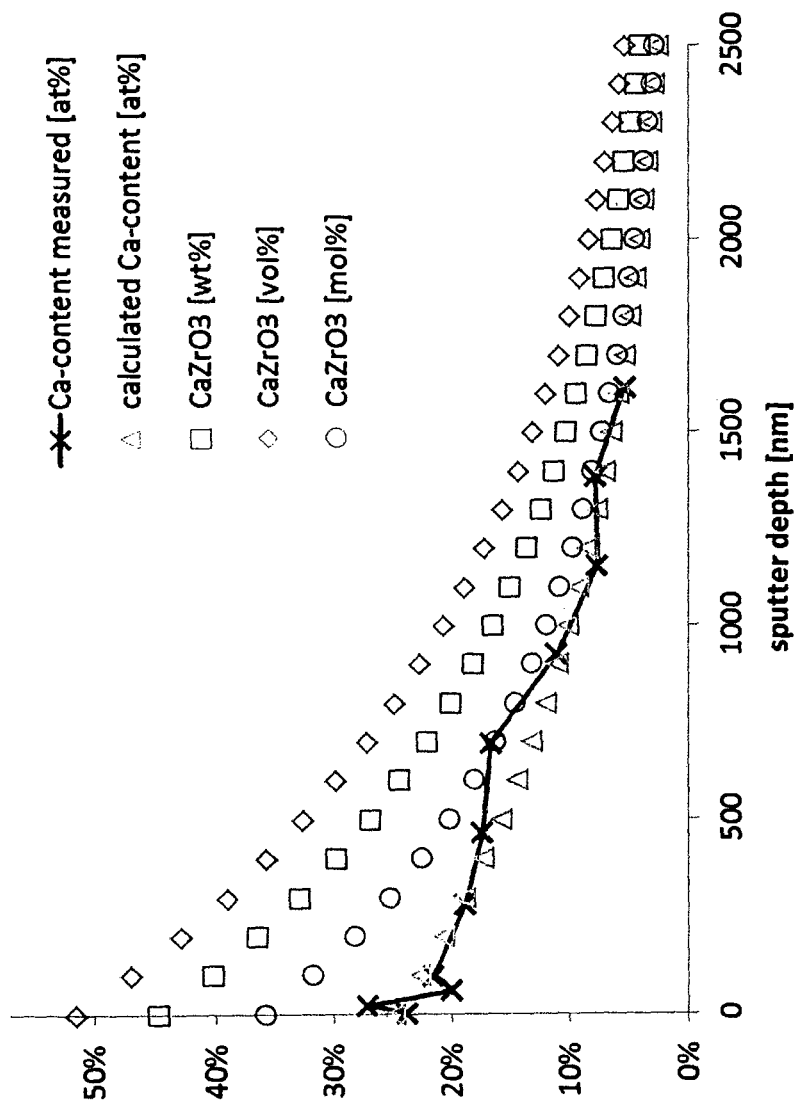

FIG. 7 showing a graphical representation of the molecular proportion (circles), the mass proportion (squares) and volume proportion (diamonds) of the calcium zirconate phase as well as the measured content of calcium (crosses) and the calculated content of calcium (triangles) in a sample 1.1 disc in relation to the depth of the disc body.

As is obvious from the decrease in the molecular proportion of the calcium zirconate phase with increasing depth in comparison to the respective decrease in the volume proportion, the formation of the calcium zirconate phase results in building up a compressive stress within the surface region.

The results of the crystal structure analysis mentioned above is shown in Table 6, showing that calcium containing crystalline phases, i.a. a calcium zirconate phase, is formed and that the formation of the calcium zirconate phase is favoured with increasing temperature.

TABLE 6

| Sample No. | ZrO$_2$ tet. | ZrO$_2$ mon. | ZrO$_2$ cub. | Ca—ZrO$_2$ | CaZrO$_3$ |
|---|---|---|---|---|---|
| 3.1 | 82.4% | 2.0% | 15.6% | 0.0% | 0.0% |
| 3.2 | 85.4% | 0.6% | 10.5% | 3.4% | 0.1% |
| 3.3 | 73.9% | 0.6% | 8.4% | 4.0% | 13.0% |
| 3.4 | 66.3% | 1.4% | 10.0% | 3.4% | 18.9% |
| 3.5 | 74.4% | 1.0% | 12.0% | 3.4% | 9.2% |

The results of the determination of the $E_{IT}$-, $H_{IT}$- and $K_{1C}$-values is given in Table 7, showing a clear trend for an increased indentation hardness and an increased fracture toughness for the samples comprising an increased amount of calcium containing crystalline phases.

TABLE 7

| Sample No. | $E_{IT}$ [GPa] | $H_{IT}$ [MPa] | $K_{1C}$ [MPa · √m] |
|---|---|---|---|
| 3.1 | 135.15 | 10727.0 | 5.17 |
| 3.2 | 159.85 | 11716.5 | 5.70 |
| 3.3 | 176.45 | 14234.5 | 6.29 |
| 3.4 | 177.40 | 14901.0 | 6.43 |
| 3.5 | 172.70 | 15826.5 | 6.21 |

The results obtained show a clear indication for the amount of calcium containing phases formed correlating with the fracture toughness of the body and a saturation for the achievable fracture toughness to be obtained at a proportion of crystalline phases of about 25%.

The invention claimed is:

1. A body made of a ceramic material based on yttria-stabilized zirconia, said body being an implant or an abutment for an implant, and comprising:
   a surface region extending from the surface of the body to a predetermined depth, the ceramic material in the surface region comprising:
      a crystalline phase A formed by zirconia in tetragonal phase, and a crystalline phase B having a crystal structure comprising, apart from zirconium and oxygen, at least one further component X in a periodic arrangement, the component X being calcium or calcium oxide, the crystalline phase B having a theoretical density that is lower than crystalline phase A and lower than 6.1 g/cm$^3$; and a core region integrally formed with said surface region, wherein a proportion of yttrium in the ceramic material is higher in the surface region than in the core region.

2. The body according to claim 1, wherein the proportion of crystalline phase B in the surface region is higher than the proportion of crystalline phase B in the core region.

3. The body according to claim 1, wherein crystalline phase B is only present in the surface region.

4. The body according to claim 1, wherein separate areas of crystalline phase B are dispersed within the surface region.

5. The body according to claim 1, wherein the proportion of crystalline phase B in the ceramic material decreases continuously in a direction from the surface of the body towards the core region.

6. The body according to claim 1, wherein the surface region extends from the surface of the body to a depth of at least 5 nm.

7. The body according to claim 1, wherein the surface region extends from the surface of the body to a depth of 10 μm at most.

8. The body according to claim 1, wherein the surface region extends from the surface of the body to a depth ranging from 5 nm to 10 μm.

9. The body according to claim 1, wherein the proportion of component X in the ceramic material decreases continuously in a direction from the surface of the body towards the core region.

10. The body according to claim 1, wherein the proportion of yttrium in the ceramic material decreases continuously in a direction from the surface of the body towards the core region.

11. The body according to claim 1, wherein at least a part of the surface of the body has a roughened surface.

12. The body according to claim 1, wherein the proportion of crystalline phase B in the surface region is in total about 25% at most.

13. A process for preparing a body according to claim 1, said process comprising
applying (a) component X and/or a precursor thereof, and (b) yttrium and/or yttria as a stabilizing agent onto the surface of a basic ceramic body made of zirconia; and
thermally treating the basic ceramic body with the component X and/or the precursor, and the stabilizing agent applied thereon at a temperature of at least 500° C., whereby component X diffuses into the basic ceramic body in an amount sufficient to form crystalline phase B, and the stabilizing agent diffuses into the basic ceramic body by the thermal treatment.

14. The process according to claim 13, wherein component X and/or the precursor are applied onto the surface of the basic ceramic body in the form of calcium or a calcium containing substance selected from the group consisting of a calcium salt, calcium oxide, calcium hydroxide, metallic calcium, and a calcium containing gel.

15. The process according to claim 13, further comprising roughening at least a part of the surface of the basic body by a subtractive treatment before applying component X and/or the precursor.

16. The process according to claim 15, wherein the subtractive treatment comprises an etching step.

17. The body obtainable by the process according to claim 13.

18. A method comprising: utilizing the body of claim 1 as an implant or an abutment for a dental implant.

19. A method comprising: increasing the fracture toughness of a basic ceramic body, by the process according to claim 13.

20. A method comprising: increasing the flexural strength of a basic ceramic body, by the process according to claim 13.

21. The body according to claim 1, wherein the proportion of crystalline phase B in the surface region is in total about 20% at most.

22. The process of claim 13, wherein component X and/or the precursor are applied onto the surface of the basic ceramic body in the form of a calcium containing substance selected from the group consisting of CaO, CaCO$_3$, Ca(HCO$_3$)$_2$, Ca(NO$_3$)$_2$, and mixtures thereof.

23. The process according to claim 15, wherein the subtractive treatment comprises a sand blasting step prior to the etching step.

24. The body according to claim 11, further comprising a surface topography defined by:
an arithmetic mean height Sa in a range of from 0.1 μm to 1.7 μm;
a skewness of a height distribution $S_{sk}$ in a range of from −0.6 to 0.6; and/or
a developed surface area Sdr in a range of from 5% to 40%.

25. The body according to claim 11, further comprising a surface topography defined by:
an arithmetic mean height Sa in a range of from 0.3 μm to 0.9 μm;
a skewness of a height distribution $S_{sk}$ in a range of from −0.4 to 0.6; and/or
a developed surface area Sdr in a range of from 10% to 30%.

26. The body according to claim 1, wherein the body is formed by co-diffusing yttria or yttrium with component X into the ceramic material.

27. The body according to claim 1, wherein the crystalline phase B is present in the surface region in a proportion in a range of from 4.1 to 25 vol. %.

* * * * *